(12) United States Patent
Douville et al.

(10) Patent No.: US 9,866,445 B2
(45) Date of Patent: Jan. 9, 2018

(54) METHOD AND SYSTEM FOR VIRTUALLY DELIVERING SOFTWARE APPLICATIONS TO REMOTE CLIENTS

(75) Inventors: Hugo Douville, Sherbrooke (CA); Florent Chandelier, Montreal (CA)

(73) Assignee: CADENS MEDICAL IMAGING INC., Granby, Quebec (CA)

( * ) Notice: Subject to any disclaimer, the term of this patent is extended or adjusted under 35 U.S.C. 154(b) by 69 days.

(21) Appl. No.: 12/988,243

(22) PCT Filed: Apr. 17, 2009

(86) PCT No.: PCT/CA2009/000510
§ 371 (c)(1),
(2), (4) Date: Dec. 30, 2010

(87) PCT Pub. No.: WO2009/127067
PCT Pub. Date: Oct. 22, 2009

(65) Prior Publication Data
US 2011/0106881 A1    May 5, 2011

Related U.S. Application Data

(60) Provisional application No. 61/071,207, filed on Apr. 17, 2008.

(51) Int. Cl.
*G06F 15/16* (2006.01)
*H04L 12/24* (2006.01)
(Continued)

(52) U.S. Cl.
CPC .............. *H04L 41/22* (2013.01); *G06F 8/61* (2013.01); *H04L 65/4015* (2013.01); *H04L 67/38* (2013.01)

(58) Field of Classification Search
CPC ..... G06F 9/4443; G06F 8/61; G09G 2340/02; G09G 2340/40; H04L 67/38;
(Continued)

(56) References Cited

U.S. PATENT DOCUMENTS 5,632,022 A * 5/1997 Warren et al. ................. 715/776
6,088,515 A * 7/2000 Muir et al. .................... 709/217
(Continued)

FOREIGN PATENT DOCUMENTS

CA        2501671 A1 * 4/2005
WO    WO 03/047710 A2    6/2003

OTHER PUBLICATIONS

International Search Report for International Application No. PCT/CA2009/000510 dated Jul. 31, 2009.
(Continued)

*Primary Examiner* — Oanh Duong
(74) *Attorney, Agent, or Firm* — Pearl Cohen Zedek Latzer Baratz LLP

(57) ABSTRACT

There is provided a method and system for delivering applications from a server system to at least one distant client devices through a computer network. The applications being physically processed at the server system but virtually delivered to the at least one client device. This allows the client device to benefit from every application of every OS as well as any processing power located at the server system such as specific hardware components and multi-computer processing units. Such method and system includes a process that encapsulates the server system software application and application environment in a Hypermedia Stream (HMS), the latter HMS providing seamless interactivity on the encapsulated and delivered software application.

20 Claims, 3 Drawing Sheets

(51) Int. Cl.
    *G06F 9/445*    (2006.01)
    *H04L 29/06*    (2006.01)
(58) Field of Classification Search
    CPC . H04L 65/4015; H04L 41/22; H04L 29/0809;
                    H04L 29/06027; H04L 29/0604
    USPC ........ 345/660; 709/203, 217, 219, 223, 231,
                                                            709/246
    See application file for complete search history.

(56)            References Cited

U.S. PATENT DOCUMENTS

| | | | |
|---|---|---|---|
| 7,254,786 B2 | 8/2007 | Henriquez | |
| 7,626,537 B2* | 12/2009 | Andrusiak et al. | 342/177 |
| 7,667,704 B2* | 2/2010 | Hogle | 345/473 |
| 7,996,787 B2* | 8/2011 | Reveman | 715/788 |
| 2003/0030575 A1* | 2/2003 | Frachtenberg et al. | 341/51 |
| 2004/0031058 A1* | 2/2004 | Reisman | 725/112 |
| 2004/0068583 A1* | 4/2004 | Monroe et al. | 709/246 |
| 2004/0103438 A1* | 5/2004 | Yan et al. | 725/109 |
| 2004/0189677 A1* | 9/2004 | Amann et al. | 345/660 |
| 2005/0035886 A1* | 2/2005 | Labelle | 341/51 |
| 2005/0160353 A1* | 7/2005 | Conrad et al. | 715/505 |
| 2006/0174026 A1 | 8/2006 | Robinson et al. | |
| 2007/0208628 A1* | 9/2007 | Amiri | 705/26 |
| 2007/0236432 A1* | 10/2007 | Benjamin et al. | 345/87 |
| 2008/0004011 A1 | 1/2008 | Ober | |
| 2008/0028285 A1* | 1/2008 | Hoche et al. | 715/205 |
| 2008/0084426 A1* | 4/2008 | Park | 345/543 |
| 2008/0091840 A1* | 4/2008 | Guo et al. | 709/231 |
| 2008/0178070 A1* | 7/2008 | Hoche et al. | 715/205 |
| 2008/0263464 A1* | 10/2008 | Muir et al. | 715/764 |
| 2008/0301566 A1* | 12/2008 | Abdo | G06F 9/4445 715/748 |
| 2009/0051583 A1* | 2/2009 | Andrusiak et al. | 342/177 |
| 2009/0132642 A1* | 5/2009 | Ortal et al. | 709/203 |
| 2009/0164994 A1 | 6/2009 | Vasilevsky et al. | |
| 2009/0183180 A1 | 7/2009 | Nelson | |

OTHER PUBLICATIONS

Office Action for Canadian Patent Application No. 2,721,174, dated Nov. 24, 2015.
Search Report for European Patent Application No. 09731906.5, dated Aug. 23, 2011.

* cited by examiner

METHOD AND SYSTEM FOR VIRTUALLY DELIVERING SOFTWARE APPLICATIONS TO REMOTE CLIENTS

CROSS-REFERENCE TO RELATED APPLICATIONS

The present application is a National Phase Application of PCT International Application No. PCT/CA2009/000510, entitled "METHOD AND SYSTEM FOR VIRTUALLY DELIVERING SOFTWARE APPLICATIONS TO REMOTE CLIENTS", International Filing Date Apr. 17, 2009, published on Oct. 22, 2009 as International Publication No. WO 2009/127067, which in turn claims priority from U.S. provisional patent application No. 61/071,207, filed Apr. 17, 2008, both of which are incorporated herein by reference in their entirety.

TECHNICAL FIELD

The present invention relates to a method and system for virtually delivering software applications to remote clients.

BACKGROUND

Since the advent of computers, multiple operating systems (OS) have emerged amongst which Linux/Unix, Windows and MacOs are today's major systems. It was not unexpected that, for a specific user application, the most efficient piece of software would be the privilege of one of these OS. Thus, for a broad range of applications, and to deliver the best software tools available, one needs to have access and to maintain a broad range of operating systems. In addition, to answer the always increasing demands of the users, some applications require greater resources than available on traditional desktop computers, requiring the integration of multi-processors and hardware specific components.

The latter two points have given resistance on both the customers and the IT staffs parts. There are many reasons for this: specific hardware components are expensive and usually need specific programming skills, developing on a multi-computer environment is a challenging task and maintaining multiple OS involves an up-to-date knowledge on every OS changes and security issues.

Over the years, different solutions have emerged to provide both users and IT staffs with improved hardware infrastructures and computer network architectures. However, there are still some major limitations.

A so called thick-client strategy applied to medical imaging network implies that every computationally intensive task associated with generating images, e.g. image rendering, be performed locally on locally stored copies of data obtained from a data server, generally the hospital PACS. There are two major drawbacks related to such approach: (1) data must be transferred prior to rendering execution, and (2) the client computer must have sufficient processing power to process the desired data. Thus, a user must accommodate his workflow with respect to when the patient data will be locally available, and the same user must make sure to have access to a proper computer at that time in order to review the downloaded patient data. This partially explains why Imaging Rooms are overloaded when multiple radiologists wish to review cases at the same time. As well, on-demand download of any patient data is not recommended has it is time and bandwidth consuming.

A so called thin-client scheme may be viewed as the opposite strategy to the thick client approach. The thin-client architecture comprises a server computer and multiple thin-client computers connected to the network comprising the server computer. The server includes or is attached to an image data storage, for example, a medical image data storage, and integrates the desired software applications and processing capabilities. The thin-client computers, via the network, request a remote control of a specific software application in order to virtually benefit the server computer capabilities in terms of fetching the medical images and further processing them. The computational load is performed at the server location, but is visualized on interacted on at the thin-client location.

The thin-client network may be heavily loaded (low bandwidth network, many simultaneous thin-client connected), but deliver any application at every desired thin-client location. The workflow of the user is thus dramatically improved over the thick client scheme as, while the server is not overloaded, any thin-client can potentially work from anywhere.

Despite its simple concept, the thin-client technology has many variations that attempt to more or less efficiently load the server side, the client side and the available network bandwidth. As well, different schemes are proposed in order to efficiently prevent any computationally intensive tasks to be carried at the client side in order to be independent of the client's hardware and software architecture as well as being independent from the application to be delivered over the network.

An approach between the "pure" thick-client and "pure" thin-client network architectures for image rendering proposes an architecture splitting the rendering tasks in between a server and a client. It is meant for rendering synthetic data, representing 3D geometric models where background and foreground objects can and must be identified prior any rendering, and where foreground objects are rendered at the client side and background objects are rendered at the server side. A composite of both the renderings is then displayed to the user at the client side. Such approach is specifically designed for application involving synthetic images integrating a plurality of different geometric object such as Computer Assisted Design applications or computer games. Two of the limitations of such techniques are: 1) the application delivered from the server to the client must be a-priori known in order to apply the proposed scheme, i.e. such strategy must be integrated directly within the delivered application source code in order to capture foreground and background objects (not applicable for any desired random application), and 2) Such an approach is not applicable in cases where a decomposition into the foreground/background and/of a different geometric object are not applicable, for example in Medical Imaging where the synthetic data are composed of voxels representing continuous and not differentiable human body parts.

A different thin-client solution is where the client to which the application is delivered must provide the appropriate User Interface to use the delivered application. This implies that the client knows a-priori the kind of application that can be delivered and that the client possesses the appropriate kind of interface a desired application would require. As a fallback mechanism, the proposed methodology may deliver such specific User Interface through a Web Browser via a Java based Module. Such requirements may lack in many cases, specifically when considering network and computer security issues that are predominant in Hospital structures, for example.

The two major limitations of such techniques are: 1) the application delivered from the server to the client must be a-priori known in order to apply the proposed scheme, i.e. such multi-node distribution architecture must be integrated directly within the delivered application source code in order to apply the desired buffering strategy (not applicable for any desired random application), and 2) such an approach is not applicable in cases where a client have no a-priori installed User Interface required by a desired delivered application and/or where a client have a restricted or no internet browser Java Enabled (not applicable within secured infrastructure like Hospitals and banks, for example).

Another solution is a web-based approach for delivering a video stream where the server must be specifically adapted for the application delivering process.

Three of the limitations of such techniques are: 1) the application delivered from the server to the client must be a-priori known in order to apply the proposed scheme; 2) such approach is not applicable in cases where a client has no a-priori installed User Interface required by a desired delivered application and/or where a client has a restricted or no Java Enabled Internet browser (not applicable within secured infrastructure like Hospitals and banks, for example); and 3) such strategy does not provide any information and/or embodiment assuring the data integrity in case of multiple/collaborative streaming process (not applicable in collaborative strategies requiring multi-client inter-actions on a unique stream).

An alternative strategy focuses on medical data visualization, whether for single or collaborative strategies.

There are two major limitations when considering the strategy described in these documents: 1) The client must have the User Interface corresponding to the delivered application locally installed and integrating the delivered application rendering features, i.e. if the abilities of the delivered application in terms of medical data volume rendering are not known and physically not accessible in terms of libraries then the application is not deliverable (not applicable for any desired random application), and 2) According to the following scheme and considering a collaborative strategy where multiple users are working simultaneously on the same delivered application, every User Interfaces at every client side is physically unlinked from each other and must be updated once one of the client has performed an action and transmitted its parameters to the others (no real-time collaborative work).

A strategy for volume rendering application delivery proposes coupling a volume rendering engine with a video streaming engine to further deliver the resulting video stream to a remotely located client.

Two of the limitations of such strategy is that: 1) one needs to have partial or full access to the source code of the desired application integrating the volume rendering engine in order to couple such volume rendering engine with a video streaming engine (not applicable for any random desired application); and 2) no process if presented to maintain the application data integrity in case of multiple collaborative work on an unique application delivered to multiple clients (not applicable for real-time collaborative work on a delivered application).

Tentative solutions to the above mentioned limitations rely on compression of the video information based on its content. Such a-priori cannot be satisfied in medical imaging, for example, where the content of the synthetic images could be as broad as a complete human body with every organs to the observation of a single cell. As well, this is not satisfied in the case of random and/or unknown content (not applicable for any random desired application).

There are no scheme to deliver an unknown application from a server to at least a client (no information required on the application at the server side, no intrusion/modification within the application source code at the server side, operating System independent scheme), without requiring any a-priori information on that application at the client side (no graphical user interface required at the client side to interact with the delivered application), and which seamlessly allows a collaborative and simultaneous work from multiple client having the same application delivered (maintain the integrity of the delivered application data, real-time collaborative work).

As such, there is a need for a method and apparatus to overcome the drawbacks and shortcomings mentioned hereinabove.

SUMMARY

According to the present invention, there is provided a system for virtually delivering software applications, comprising:
  a telecommunications network;
  at least one system server;
  at least one client device communicatively coupled to the at least one system server through the telecommunications network, the at least one client device enabling a user to request a software application from the system server; and
  at least one application server associated with the at least one system server, the at least one application server being so configured as to execute the requested software application;
wherein the system server is so configured as to generate a hypermedia stream encapsulating at least a graphical user interface of the software application executed by the application server and delivering the hypermedia stream to the at least one client device; and
wherein the at least one client device is so configured so as to display the hypermedia stream content and allow the user to transmit interaction information to the at least one application server so as to be provided to the executed software application.

According to the present invention, there is also provided a method of virtually delivering a software application from an application server having a compositing window manager to at least one client device communicatively coupled to application server through a telecommunications network, comprising:
  storing a graphical user interface content of the executed software application from the compositing window manager into a memory buffer;
  accessing the memory buffer;
  generating a hypermedia stream encapsulating at least the graphical user interface content of the memory buffer; and
  delivering the hypermedia stream to the at least one client device.

The foregoing and other objects, advantages and features of the present invention will become more apparent upon reading of the following non-restrictive description of illustrative embodiments thereof, given by way of example only, with reference to the accompanying drawings.

DETAILED DESCRIPTION

Generally stated, illustrative embodiments of the present invention are concerned with a method and system for virtually delivering software applications from a server system to at least one distant Human Interface Device (HID) (i.e. client device) through a computer network. The applications being physically processed at the server system but virtually delivered to the at least one HID. This allows the HID to benefit from every software application of every Operating system (OS) as well as any processing power located at the server system such as specific hardware components and multi-computer processing units. Such method and system includes a process that encapsulates the server system software application and application environment in a Hypermedia Stream (HMS), the latter HMS providing seamless interactivity on the encapsulated and delivered software application.

Figure 1:
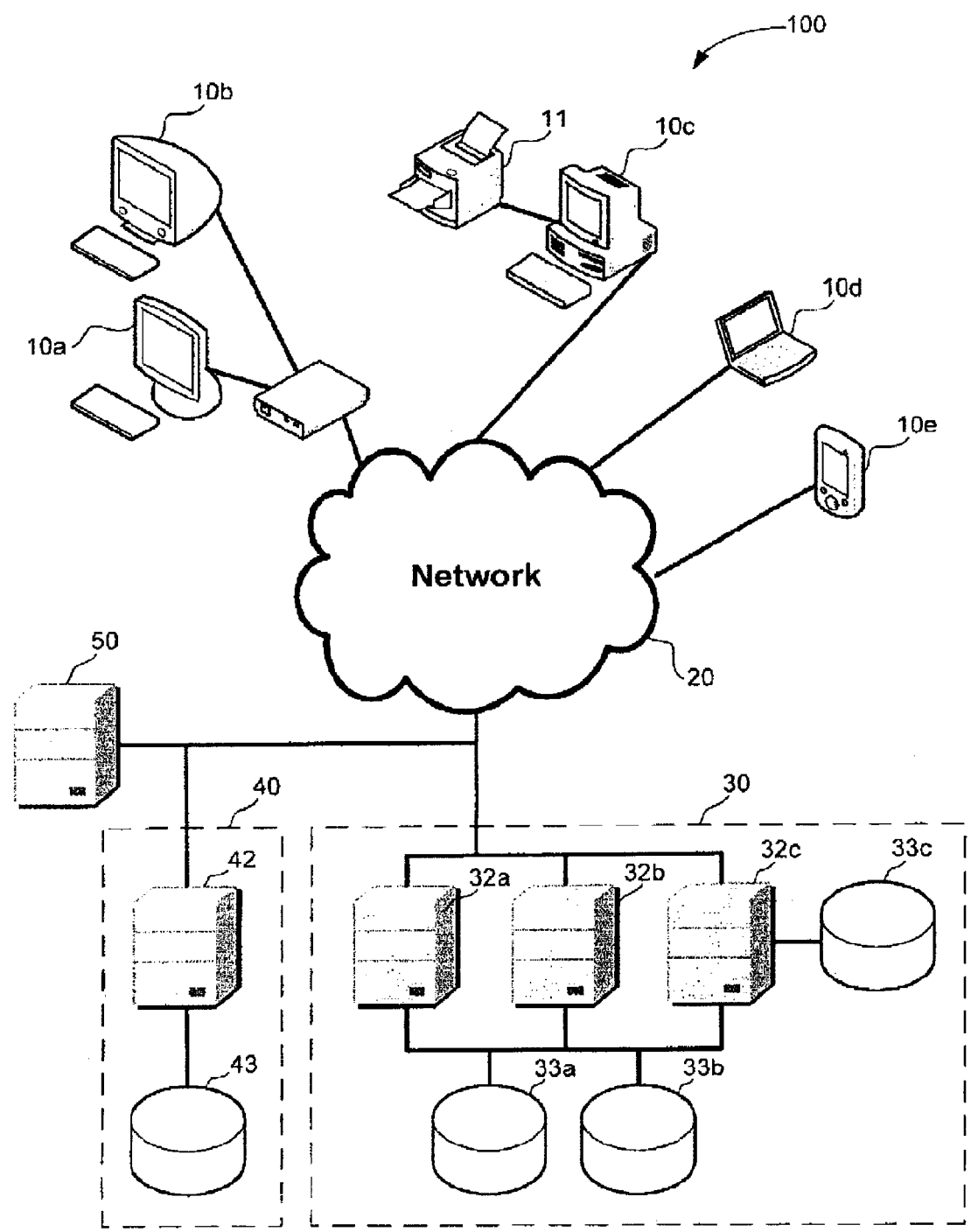
FIG. 1 is a schematic view of the remote application system according to an illustrative embodiment of the present invention.

Referring to FIG. 1, there is shown and illustrative example of a virtual software application delivery system 100 which includes Human Interface Devices (HID) 10a, 10b, 10c, 10d and 10e communicatively coupled to server systems 30 and 40, and optional proxy server 50, via a telecommunications network 20 such as, for example, Ethernet or Gigabit Ethernet, wireless WiFi, cable Internet, satellite connection, Bluetooth, etc. through clear or encrypted protocols such as UDP, TCP/IP, SSL or SSH to name a few. Each server system 30 and 40 includes associated application servers 32a, 32b, 32c and 42 as well as data servers 33a, 33b, 33c and 43.

It should be noted that the communication protocol of network 20 used for communications between the system servers 30, 40 and the HIDs 10 advantageously operates independently of the OS, software applications and/or functions running on the system servers 30, 40 and the HIDs 10.

The HIDs 10a, 10b, 10c, 10d and 10e are minimal client devices capable of receiving data from the network 20, displaying data and receiving input commands from a user, and further sending such commands through the network 20. The HIDs 10a, 10b, 10c, 10d and 10e are the means by which a user can access and remotely interact with at least one software application on at least one server system 30 or 40 through at least one HSM that captures any software application Graphic User Interface (GUI), encapsulates the captured data and delivers this to the HIDs 10a, 10b, 10c, 10d and 10e accessing the software application. The HMS, which is generated by the HMS encoder/decoder, will be detailed further on. As such, each HID 10a, 10b, 10c, 10d and 10e includes the electronic needed for network interfacing, network data transmission and reception, and data display. Accordingly, the HIDs 10a, 10b, 10c, 10d and 10e may take various forms such as, for example, computer terminals 10a and 10b, a personal computer 10c with associated printer 11, a laptop computer 10d, a personal digital assistant 10e, or any other such computing device.

For the sake of clarity, the HIDs 10a, 10b, 10c, 10d and 10e will be collectively referred to as HID 10 from hereon.

The HID 10 includes a minimal client application that decodes the HMS sent from a system server 30, 40 and virtually interacts with the software application which is encapsulated within the HMS, any virtual interaction being streamed back to the system server 30, 40 that physically and locally executes the desired client interactions. Such minimal client application is a standalone application or an internet browser plug-in, being a cross-platform light piece of software, decoding the HMS and providing interactivity with the encapsulated software application within the HMS without prior knowledge required about the streamed software application. Such minimal client application does not have to be a GUI of any type as opposed to prior art technologies. The HID 10 may comprise, for example, a video decoder, a transceiver, a processor, a video display bridge, an audio bridge and a peripheral bridge.

For a given software application, the required GUI is encapsulated within the HMS. Furthermore, during simultaneous reviewing of some processed data on multiple HIDs 10 interconnected by the network 20, each HID 10 can interact on the same GUI with only little lag time (which may vary depending on the network 20 and sub-networks bandwidth) as the interaction of HID 10 will have a simultaneous and direct action on the display of any other HID 10 sharing the software application. This is due to the fact that multiple HIDs 10 can simultaneously interact with a unique software application running on one of the system servers 30, 40 and that no other processing task related to that software application are dispatched to any HID 10.

The server systems 30, 40 can include multiple 32a, 32b and 32c or single 42 application servers in the form of parallel and/or distributed Central Processing Units (CPU) and/or computers, hardware and software accelerators, controllers and a variety of plug-and-play components and any other devices having minimal computational capabilities. Each application server 32a, 32b, 32c and 42 may provide one or more software application to one or more HID 10. Thus, the software application may be shared by multiple HIDs 10, so that each HID 10 has the opportunity to interact with the software application.

Data and computational functionality are thus provided by the server systems 30, 40 through their associated data servers 33a, 33b, 33c and 43, and application servers 32a, 32b, 32c and 42. At the HID 10, all functionality is eliminated except that which generates output to the user (e.g. display, sound, etc.), takes input from the user (e.g. mouse, keyboard, pad, etc.) or other peripherals that the user interacts with (e.g. scanner, camera, removable storage, etc.). All computing is done by the server systems 30, 40 and the computing is done independently of the destination of the data being generated. Data from an external source such as the Internet, the World Wide Web, or other remote servers, for example a PACS server in a hospital, may also by provided by the server systems 30, 40. This allows the HIDs 10 to benefit from the processing power of the server systems 30, 40 (e.g. specific hardware components, CPUs, computers, etc.).

This provides for improved security of sensitive data since a user remotely interacts with a software application that is executed on one of the application servers 32a, 32b, 32c or 42 which means that the data physically remains at the associated system server 30 or 40. Furthermore, the installation of multiple copies of sensitive software on every HID 10 (i.e. desktop/laptop computer) is also prevented.

This also allows the HIDs 10 to use software applications regardless of their OS and hardware/processing capabilities. Thus, the most efficient pieces of software and hardware with regards to a user's needs can be accessed by any HID 10 regardless of its OS, location and hardware components. This reduces the costs and risks usually associated with the delivery and the integration of multiple software applications on multiple OS and/or multiple computers in a computer network.

Accordingly, integration of a new software application simply requires the installation of the new software application, with any required hardware, on one of the system servers 30 and/or 40, instantly allowing remote access without recompiling and/or relinking any application programs on the HIDs 10.

As mentioned previously, the HMS is the means by which the HIDs 10 access and remotely interact with the software applications on the server systems 30 and 40, which "virtually deliver" the software application to the HIDs 10. The HMS is generated by the HMS encoder/decoder that encapsulates the software application and application environment, providing seamless interactivity on the encapsulated and delivered software application.

The HMS is generated such that related items of information are connected and can be presented together, including links among any set of multimedia objects, including but not limited to sound (e.g. voice commands, etc.); video (e.g. movies, video streams, video-conferencing, etc.); virtual reality; text/hypertext (e.g. Word document, HTML document, XML document, etc.).

The HMS encoder/decoder includes three main components and an optional one, namely a HMS generator, a HMS interaction manager and an optional proxy manager.

HMS Generator

A first component, the HMS generator generally integrated on the system server 30, 40, encapsulates a software application GUI render window or any sub-windows provided by a compositing window manager (CWM) into a video stream.

The CWM may be purely software-based or fully integrated into a graphics card (i.e. by means of the graphics card GPU and embedded graphic memory card). The latter is made possible through techniques like CUDA from NVidia. The performance of a purely software-based CWM relies on the local CPU power, while that of a CWM integrated into a graphics card shifts part of the computing load from the CPU to the GPU, thus freeing the CPU. It is to be understood that both the CWM and the HMS generator may be both integrated on the graphics card (such as Linux OpenGL CWM EComorph and the video encoder from Elemental Technologies, respectively), benefiting from fast memory access and thus a tremendous gain in speed. It is also to be understood that a hybrid strategy mixing both approaches may also be used.

The HMS generator may include a video encoder that may be adapted to dynamically compress video information according to currently available network 20 and/or HID 10 capacity and/or other criteria such as, for example, a desired lossless quality or image resolution. Moreover, the video encoder may dynamically select from a plurality of lossless or lossy compression algorithms such as, for example, MPEG1-2-4 or H.264 to name a few. The HMS generator then delivers the HSM to the HID 10.

The video stream may be optimized to deliver the image data in a format suitable for the video decoder in the HID 10, instead of for the screen display. For example, the frames may be rendered in blocks rather than scan lines, or may use a format that samples color components for only every other line, as with a television. The coupling between graphics generation and video encoding generally reduces hardware bandwidth and complexity.

In an alternative embodiment, the HMS may contain a specific object integrating all or some of the tools/action buttons, for example in the form of menu options, required to interact with the functionality of the software application encapsulated in the HMS video stream, thus preventing the HID 10 from changing and adapting its graphical user interface to interact with the software application. The menu options can be toggled on and off by a client command from the HID 10. The HMS may enable a message or menu options to be embedded in a non-intrusive fashion so as not to obscure the principal image being viewed on the screen display of the HID 10 and yet provide the necessary information and functionalities. Such embedded menu options may further provide the ability to invite other participants for a collaborative session and handle any further collaborative actions such as, for example, interaction exclusivity rights to allow locking and unlocking HMS interactivity or switch between multiple video stream layers embedded within a single HMS.

It is to be understood that in an alternative embodiment, the HMS generator may generate a video stream, an audio stream, static images data, data packets corresponding to interaction information or a peripheral bridge (which will be detailed further below), or a combination thereof.

HMS Interaction Manager

A third component, the HMS interaction manager generally integrated on both the HID 10 and the system server 30, 40, handles the remote HID 10 interaction with the delivered virtual software application. Furthermore, the HMS interaction manager handles information from the peripheral devices supported by the HID 10 (USB, printer 11, etc.) so that they are virtually accessible from the software application that is executed on the system server 30, 40 (i.e. by its associated application server 32*a*, 32*b*, 32 *c* or 42). Additionally, it is the role of this component to leverage any hardware/software residing on the HID 10 for HMS decoding. In an alternative embodiment, the HMS interaction manager at the HID 10 may generate a HMS encapsulating at least one peripheral bridge allowing access to the HID 10 supported peripheral devices to the software application that is executed on the system server 30, 40 (i.e. by its associated application server 32*a*, 32*b*, 32 *c* or 42).

It is to be understood that the HMS may be used with HIDs 10 that do not have the ability to decompress video streams, in which case the HMS generator will sense this and generate a HMS with an uncompressed video stream.

Proxy Manager

An optional fourth component, the proxy manager generally integrated on the optional proxy server 50, communicates with the various HIDs 10 and system servers 30, 40 in order to direct requests from the HIDs 10 to the appropriate system servers 30, 40 and/or application server 32*a*, 32*b*, 32*c* and 42, manage access rights, manage loads on the various system servers 30, 40 and/or application server 32*a*, 32*b*, 32*c* and 42, etc.

It is to be understood that to improve performance, some or all of the HMS encoder/decoder components may be integrated on different CPUs and/or computers, for example a dedicated CPU or computer.

In the illustrative embodiment of the present invention, the HMS encoder/decoder delivers from the system server 30, 40 to the HID 10 a HMS integrating a video stream and from the HID 10 to the system server 30, 40 a HMS integrating the user's interactions combined to a HID 10 state data stream.

The system server 30, 40 that hosts the software application requested by a HID 10 locally launches the software application through an associate application server 32*a*, 32*b*, 32*c* or 42 with a dynamic object associated with the software application, or locally launches the software application while the dynamic object already and continuously resides in the system server 30, 40 memory to further monitor every OS events and commands. The purpose of such association is to have a dynamic object residing in a memory buffer, potentially that of the graphic hardware component or in the physical RAM of the system server 30, 40, (or one of its associated application servers 32*a*, 32*b*, 32*c* or 42) which monitors the rendering viewport(s) and/or GUI associated with a specific software application and every further instance of a rendering viewport and/or GUI started by the monitored software application. This can be achieved, for example, by capturing OS commands and events. In essence, this corresponds to a CWM managing multiple distant window managers on distant operating systems.

The memory buffer pointed to or captured by the dynamic object associated with a specific software application is further redirected to the HMS generator component of the HMS encoder/decoder that extracts the software application GUI or any other rendering windows associated with the software application, and further sends these to a video encoder which generates a video stream containing the specific application rendering viewport(s). The generated video stream is then encapsulated and sent from the system server 30, 40 to the HID 10.

Each new memory buffer and/or reallocated memory buffer pointed by or captured by a dynamic object associated with a specific software application and instantiated by an already launched software application integrated within an existing HMS is encoded as an additional video stream layer to the already existing video stream belonging to the software application instantiating the new rendering viewport. In the latter case, the final HMS would contain a number of video stream layers equal to the number of viewports instantiated by the initial software application.

The dynamic object associated with a specific software application and pointing to or capturing a memory buffer indicates whether or not that memory buffer has been updated. In the case that the memory buffer has not been changed, the video encoder might encode a NULL stream, thus eliminating any further bandwidth waste, or encode a High-Definition video stream in order to benefit from a no-update time to improve the HMS quality (and thus the experience of the user at the HID 10 location). In the case where the memory buffer has been updated, the video encoder will encode new video frames based on the HID's 10 characteristics, whether transmitting only the updated part of the memory buffer or retransmitting the full memory buffer.

The generated HMS is then relayed to a transceiver on the system server 30, 40 that transmits the HMS to the HID 10, whether directly or through the optional proxy server 50 depending on the centralized/distributed network architecture. The HID 10 decodes the HMS using the appropriate decoder which is provided locally on the HID 10 by the HMS interaction manager component of the HMS encoder/decoder or an appropriate decoder sent by the system server 30, 40. It should be noted that no a-priori information about the HMS content is needed in order to decode the HMS as well as no a-priori information about the delivered software application type.

As for the HID 10, the HMS interaction manager transmits to the server system 30, 40 information about the interactions to be executed on the specific software application linked to and/or contained in the HMS delivered by the system server 30, 40 connected to the HID 10. The instructions information transmitted by the HID 10 comprises user inputs such as mouse, keyboard, sound and joystick interactions to name a few (e.g. simple movements such as displacements, clicks and advanced movements such as drag'n'drops), the HID's 10 display resolution, the HID's 10 transceiver component speed (e.g. Gigabit, infiniband) and the HID's 10 nature (e.g. laptop, mobile device, smart phone) to name a few. This instructions information is received and by the interaction manager on the system server 30, 40, which executes the desired user interactions locally on the software application contained and/or linked to the sent HMS and then updates the HMS parameters in order to generate a new HMS matching the HID's 10 nature.

Buffering

When in a collaborative mode, interactions from any of the collaborating HIDs 10 are viewed by the other collaborating HIDs 10, whether every HID 10 participate to the collaborative work by sending interactions or simply act as a viewer.

This is achieved by allowing multiple HIDs 10, which have the privilege to operate on the data within or linked to the HMS, to access simultaneously the same HMS from the same local memory buffer, or an exact pseudo-realtime or realtime replica of such specific memory buffer at a different advantageous network location. Such advantageous network location of the replica might be determined based on the network bandwidth and load balance with respect to the HID 10 network location and/or some specifically designed high bandwidth area within the network to which the HID 10 is connected. Thus, multiple HIDs 10 may interact simultaneously providing collaborative interactions, whether from physically different HIDs 10 or on one or more multi-input multi-touch device and/or application.

In order to provide coordinated access to the software application, one HID 10 locks the HMS interactivity for a time-exclusive interactive use of the data within or linked to the HMS memory buffer. Such a lock is a computer strategy that allows the management of multiple HIDs 10 accessing simultaneously the same memory buffer. When one HID 10 gains access to the executed software application, it locks access to the executed software application, forcing the others to wait until it is done with the interaction and unlocks it. Thus, multiple HIDs 10 can access and operate on the same HMS and/or memory buffer without corrupting the data linked and/or within the HMS for the other HIDs 10 wishing access to it. Such a lock strategy only applies to software application interactions, during which all of the HIDs 10 that simultaneously connected to the HMS may see the interactions of the locking HID 10 in realtime, request interaction in realtime, or use an audio HMS to further comment on the seen privileged interaction (i.e. the interactions of the locking HID 10).

Furthermore, a single system server 30, 40 may deliver multiple HMS, to one or more HID 10, while preserving the integrity of the data linked to and/or contained by each of the generated HMS.

Requesting of a Software Application

Figure 2:
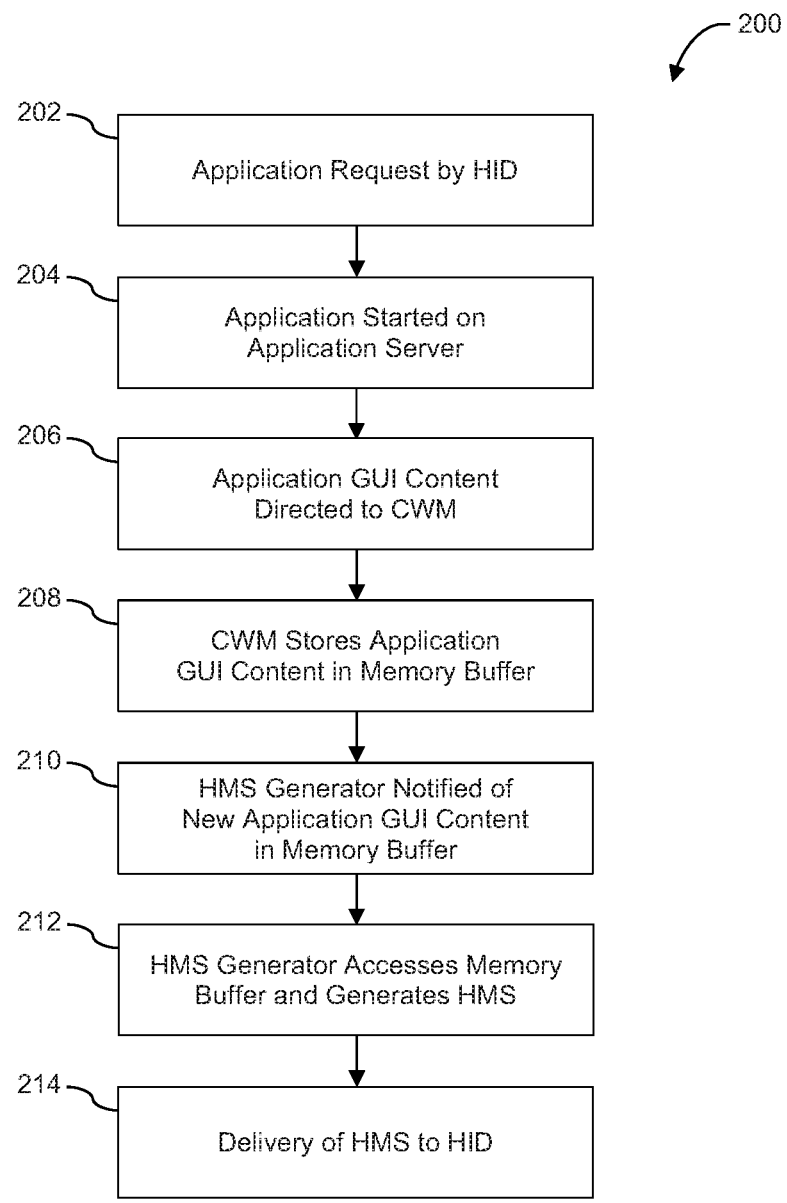
FIG. 2 is a flow diagram of an illustrative example of the process of a Human Interface Device (HID) requesting a software application from a system server.

Referring to FIG. 2, there is shown a flow diagram of an illustrative example of the process 200 of a HID 10 requesting a software application from a system server 30, 40. The steps of the process 200 are indicated by blocks 202 to 214.

The process 200 starts at block 202 where the HID 10 requests a specific software application, either directly from the system server 30, 40 or through the optional proxy server 50.

At block 204, the requested software application is started on the appropriate application servers 32a, 32b, 32c or 42.

At block 206, the software application GUI content is directed to the CWM. The CWM is a component of a computer's rendering environment system that draws windows and/or their borders. The main difference between a compositing window manager and a standard window manager is that instead of outputting the software application GUI to a common screen from the graphic output memory, the software application GUI of each software application is first stored in a separate and independent memory buffer, or temporary location inside the computer, where they can be manipulated before they are displayed.

Then, at block 208, the CWM stores the software application GUI content in the memory buffer and, at block 210, the HMS generator is notified that a new software application GUI has been stored in the memory buffer.

At block 212, the HMS generator accesses the software application GUI content in the memory buffer and generates the HMS, for example a video stream. It is to be noted that since it is the software application GUI content that is accessed by the HMS generator, any 2D and/or 3D process has already been executed as required by the software application, whether leveraging a graphic card GPU, one or more CPU or any other available hardware component. Accordingly, the HMS generator is transparent to the software application execution.

It is also to be noted that no specific drivers are required as the HMS generator accesses the software application GUI content directly from the memory buffer prior the compositing of a final desktop environment further sent to the graphic output memory for desktop display. Indeed, since all software applications render to an off-screen memory buffer, prior to be composited, they can be accessed from the memory buffer and further embedded in other applications, e.g. the HMS.

This access of the software application GUI content directly from the memory buffer has many advantages. A first advantage is that since the off-screen buffer is constantly updated by the software application, the embedded rendering will be a dynamic representation of the software application GUI and not a static rendering. Another advantage is that multiple HIDs 10 may interact on multiple or identical software applications as they are pulled from the system server 30, 40 memory buffer, while everything is normally processed at the system server 30, 40 without modification of any of the software application to be streamed, with no need to apply 3D actions on the client side.

Finally, at block 214, the HMS is delivered to the requesting HID 10.

It is to be understood that the HID 10 may request a software application that has already been requested by another HID 10, in which case, depending on privilege and/or permissions of the newly requesting HID 10, the HMS is used in a collaborative mode.

Interaction with the Software Application

Figure 3:
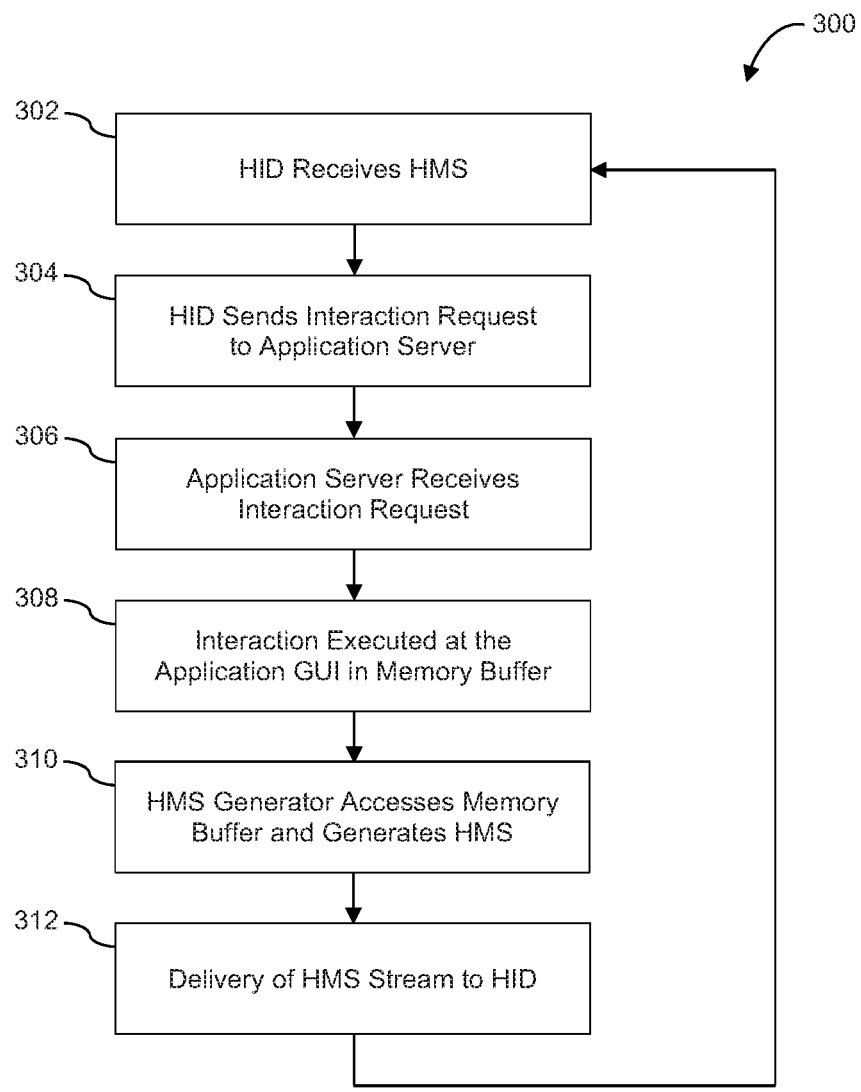
FIG. 3 is a flow diagram of an illustrative example of the process of a HID interacting with a software application.

Referring now to FIG. 3, there is shown a flow diagram of an illustrative example of the process 300 of a HID 10 interacting with a software application. The steps of the process 300 are indicated by blocks 302 to 312.

The process 300 starts at block 302 where the requesting HID 10 receives the HMS.

At block 304, the HID 10 sends interaction requests to the appropriate application servers 32a, 32b, 32c or 42. This is accomplished by recording key sequences from the keyboard, mouse clicks, movements, etc. and their coordinates on the displayed HMS content and delivering them to the appropriate application servers 32a, 32b, 32c or 42.

At block 306, the appropriate application server 32a, 32b, 32c or 42 receives the interaction requests which are provided to the HMS interaction manager.

Then, at block 308, the interaction requests are executed at the software application GUI in the memory buffer.

At block 310, the HMS generator accesses the software application GUI in the memory buffer and generates a HMS.

Finally, at block 312, the HMS is delivered to the interacting HID 10.

The process 300 then goes back to block 302.

It is to be understood that multiple HIDs 10 may collaborate and share a common software application, in which case the interacting HID 10 locks the HMS interactivity for a time-exclusive interactive use of the data within or linked to the HMS memory buffer after which the HMS is delivered to each of the collaborating HID 10.

Centralized Distribution Strategy

Optionally, the HMS can be distributed through a centralized distribution architecture. In such strategy, every existing HMS is routed to a central location within the network such as, for example, a specific system server 30 or 40, or a proxy server 50. Then, from that particular location, every HID 10 may request an access to one or more software application through a HMS. The generation of the HMS might be done (1) at the central location itself, i.e. at the central system server 30 or 40 or the proxy server 50, or (2) on one or more remote system servers (not shown) that independently generate the HMS and further provide them to the central location through the network 20.

The former strategy (1) might drastically reduce the cost and network load required to generate and send the HMS in case where the objects and the processing power needed to generate the HMS can be handled by the central system server 30 or 40 or the proxy server 50 itself. In addition, such strategy allows for the design of a dedicated and self-sufficient device delivering specific functionalities to the HIDs 10 by means of delivering one or more HMS.

The latter strategy (2) allows the central location to focus on managing the HIDs 10 access rights and determine a set of parameters that might improve the delivery of HMS to the HIDs 10, like determining the HMS compression ratio based on the network 20 load balance for example. As well, this strategy allows for the determination of hardware specific component to be integrated at the remote system servers (not shown) generating the HMS and based on the requirements of the objects and functionalities to be delivered to the HID 10 by means of the HMS. This extends the local system servers 30, 40 capabilities beyond a single device power by using the distributed power of multiple devices across a network 20.

Peripheral Bridge

One or more remote HMS functions can be used in order to create a peripheral bridge that allows the implementation of a fully functional virtual file system. This may be achieved so that no patch and/or additional piece of software need to be recompiled and/or relinked. This is performed by delivering a virtual file system referring to the client local file system, from the HID 10 to the system server 30, 40 delivering the desired software applications/functions.

Unlike traditional file systems which essentially save data to and retrieve data from a storage device, virtual file systems do not actually store data themselves. They act as a view or translation of an existing file system or storage device. In principle, any resource available can be exported to a HMS server as a file system. In addition, the exportation of such virtual file system may be done through an encrypted stream preventing any outside party to have access to the client environment.

This allows any system server 30, 40 to deliver software applications and/or functions that might open/save/update any HID 10 local and distant files/peripherals as well as every system server 30, 40 local and/or distant files/peripherals. Such capability is a tremendous benefit over, for example, X-proxy and GLX-forking techniques used with computers using the Linux OS.

Use of the Software Application Delivery System in the context a Multi-Dimensional Imaging Device (MDID)

The virtual software application delivery system 100 can be advantageously applied to medical imaging, particularly to the processing of medical images in a network environment, and with application to medical data visualization, medical data rendering and medical computer aided diagnostic to name a few.

Computer networks, and more specifically hospital infrastructures, allow medical data, medical devices and every medical computing application to be shared amongst every user with the appropriate privileges. As opposed to the traditional data management of hard copies (films, CDs, papers and other hard media), a computer network allows the centralization of most data and computer resources through a Picture Archiving and Communication System (PACS), increasing the level of collaboration between hospital staffs (clinicians, physicians, radiologists, teleradiologists, nurses to name a few). This dramatically reduces the amount of space needed to store any patient data and increases the workflow of every hospital staff members.

A MDID integrating one or more multi-dimensional data processing server comprises different software applications such as, for example, Computer Aided Diagnostic software (CAD), data rendering software, data processing software, within a network environment and situated, whether from time to time or permanently, in the vicinity of an image acquisition device such as, for example, a CT Scanner or a PACS server.

The virtual software application delivery system 100 allows users (e.g. healthcare providers) at one or more HID 10 to remotely visualize, render, study and diagnose patient data at on a system server 30, 40 integrating the MDID, which may be located either inside or outside the hospital facility and infrastructure. The MDID (e.g. system server 30, 40) fetched images from a data servers 33*a*, 33*b*, 33*c* and 43 (e.g. PACS server), which are then processed by the MDID, whether automatically using some default parameters, by digitally and/or mathematically determining the required processing technique parameters, or using some processing technique parameters specified by at least one HID 10 that is permanently or punctually linked to the MDID. Then any further processing results, whether 2D, 3D or n-D rendering volume images constructed at the n-dimensional image processing server as well as any other processing results from any CAD algorithms (e.g. images, volumes, digital diagnosis, etc.) are further delivered and displayed on the one or more HID 10.

The patient data to be processed may be a single dataset comprising a single patient image dataset or multiple datasets from a plurality of patients. Whether the dataset(s) to be investigated contains a plurality of procedures or not, the MDID can automatically process the patient(s) dataset(s) and performs automatic computer aided diagnostics for each dataset.

Furthermore, a user at a HID 10 can share its use of the MDID and processing results with a number of users linked to the MDID from other HIDs 10.

For example, it is possible for radiology specialists at respective HIDs 10 to simultaneously observe a three-dimensional image that is being constructed or numerically processed during CAD processing on the MDID. This improves understanding on the part of the referring physician by facilitating mutual understanding between multiple radiographic specialists. This stands in contrast to cases where a three-dimensional image constructed by a radiographic specialist is sent via film, etc., to any other radiographic specialists of any requesting department.

Because the dataset(s) are initially processed at the MDID, it can be quickly delivered to the connected HIDs 10 trough a HMS. In addition to having the processed data delivered to it, the requesting HID 10 can interact with the software application process content in order to modify any processing technique parameters. As well, any other simultaneously connected HID 10 that has sufficient privileges may also interact with the processed data.

It is to be understood that other software applications may also be requested parallel to the MDID.

This provides for an extremely cost-effective, ubiquitously accessible solution that also provides data protection and data management, and significantly relaxes requirements on network as well as the user's local computer (e.g. software and hardware). Furthermore, the virtual software application delivery system 100 can serve as an enterprise-wide Picture Archiving Communication System (PACS) and can be readily integrated with other PACS and image distribution systems.

Other Applications

The virtual software application delivery system 100 finds applicability in a variety of other domains such as data rendering, visualization and scientific processing, teleradiology, defence, computer assisted design, finite element analysis and simulation, weather forecast and earth science imaging, network games, entertainment imaging and cinemas, telecommunication, healthcare imaging, life science and bioscience imaging, aerospace and telescope imaging, aeronautic control and imaging, financial and accounting, text edition, to name a few.

This is intrinsically related to the fact that the virtual software application delivery system 100 allows the delivery of any software application from a server (e.g. system server 30, 40) to a client (e.g. HID 10), to further allow the client to interact on such delivered software application but preserving the computational tasks at the server side, disregarding the client hardware and software capabilities.

This provides flexibility to application developers by allowing cross-operating system deployments without considering the client device hardware limitations, to IT staff by minimizing maintenance costs, and to companies by preventing any hard software installation on any employee's desktops and/or laptops.

It is to be understood that the virtual software application delivery system 100 may be realized in hardware, software or a combination of hardware and software. It may also be realized in a centralized fashion in at least one computer system or in a distributed fashion where different elements are spread across several interconnected computer systems. Any kind of computer system or other apparatus adapted for carrying out the methods and processes described herein is suited. A typical combination of hardware and software may be a general-purpose computer system with a computer program that, when being loaded and executed, controls the computer system such that it carries out the methods and processes described herein.

It is to be further understood that the present invention is not limited in its application to the details of configurations illustrated in the accompanying drawings and described hereinabove. The invention is capable of other embodiments and of being practiced in various ways. It is also to be understood that the phraseology or terminology used herein is for the purpose of description and not limitation. Hence, although the invention has been described herein by way of illustrative embodiments thereof, many modifications and applications may be contemplated without departing from the spirit of the invention.

What is claimed is:

1. A system for virtually delivering concurrently multiple software applications, comprising:
    a telecommunications network;
    at least one system server comprising multiple software applications;
    at least one client device located remotely from the at least one system server and communicatively coupled to the at least one system server through the telecommunications network, the at least one client device enabling a user to request multiple of the multiple software applications from the system server; and
    at least one application server associated with the at least one system server, the at least one application server configured to concurrently execute multiple of the multiple software applications at the at least one system server;
    wherein the at least one application server includes a compositing window manager configured to composite, at the at least one system server, a final representation of a graphical user interface of each of said concurrently executed multiple software applications independently of each other, and store each of said final representations in a separate memory buffer that is different than, and independent from, a graphics output memory and in which each of said concurrently executed multiple software applications can be manipulated separately from others of said multiple software applications;
    wherein the system server further comprises a hypermedia stream generator configured to access each separate memory buffer and to generate at the at least one system server a hypermedia stream encapsulating at least one final representation of a graphical user interface corresponding to the multiple software applications requested by the user; the at least one system server configured to deliver the hypermedia stream to the at least one client device; and
    wherein the at least one client device is configured to display content from the hypermedia stream via the graphics output memory at the at least one client device, and to allow the user to transmit interaction information to the at least one application server for interacting with the multiple executed software applications.

2. The system according to claim 1, wherein the hypermedia stream includes a stream selected from a group consisting of a video stream, an audio stream, static images data, data packets corresponding to interaction information, a peripheral bridge and a combination thereof.

3. The system according to claim 1, wherein the hypermedia stream is generated by a hypermedia stream encoder/decoder.

4. The system according to claim 3, wherein the hypermedia stream encoder/decoder includes:
    a hypermedia stream generator for generating the hypermedia stream and a hypermedia stream interaction manager associated with the at least one system server; and
    a hypermedia stream interaction manager associated with the at least one client device.

5. The system according to claim 4, wherein the hypermedia stream generator includes at least one video encoder adapted for dynamically compressing video information and wherein the at least one client device includes at least one corresponding video decoder.

6. The system according to claim 5, wherein the video encoder is adapted for dynamically compressing video information according to currently available capacity of the telecommunications network.

7. The system according to claim 5, wherein the video encoder is adapted for dynamically compressing video information according to currently available capacity of the at least one client device.

8. The system according to claim 5, wherein the at least one video encoder is selected from the group consisting of MPEG 1, MPEG 2, MPEG 4 and H.264.

9. The system according to claim 1, wherein each memory buffer resides in a memory location selected from a RAM of the at least one application server, a graphic hardware memory of the at least one application server, a RAM of the at least one system server, a graphic hardware memory of the at least one system server and a combination thereof.

10. The system according to claim 1, wherein the compositing window manager is software-based.

11. The system according to claim 1, wherein the compositing window manager is integrated into a graphics card.

12. The system according to claim 1, wherein the hypermedia stream generator includes a video encoder and wherein the video encoder encodes a NULL stream when the memory buffer has not changed.

13. The system according to claim 1, wherein the hypermedia stream interaction manager at the client device and the hypermedia stream interaction manager at the at least one application server cooperate to transmit interaction information from peripheral devices supported by the client device to the at least one application server so as to be provided to the one or more executed software applications.

14. The system according to claim 1, wherein the final representation of the graphical user interface is the software application graphical user interface render window provided by the compositing window manager.

15. A method of virtually delivering concurrently executed multiple software applications from an application server having a compositing window manager to at least one client device communicatively coupled to the application server through a telecommunications network, comprising:
    storing a final representation of a graphical user interface of each of said concurrently executed multiple software applications from the compositing window manager into a memory buffer that is different than, and independent from, a graphics output memory and in which each of said concurrently executed multiple software applications can be manipulated separately from others of said multiple software applications;
    accessing the memory buffer;

generating a hypermedia stream encapsulating at least the final representation of the graphical user interface of the memory buffer for each of said concurrently executed multiple software applications; and delivering the hypermedia stream to the at least one client device, wherein said client device is configured to display content from the hypermedia stream via the graphics output memory at the at least one client device.

16. The method according to claim 15, further comprising:

transmitting interaction information from the at least one client device to the application server; and providing the interaction to the executed software application.

17. The method according to claim 16, further comprising delivering the hypermedia stream to at least two client devices.

18. The method according to claim 17, wherein the providing of interaction information to the executed software application is selectively locked for a time-exclusive interactive use by a given one of the at least two client devices.

19. The method according to claim 15, wherein the hypermedia stream includes a video stream and the step of generating the hypermedia stream includes dynamically compressing video information, the method further comprising decompressing the hypermedia stream delivered to the at least one client device.

20. The method according to claim 15, further comprising generating a hypermedia stream encapsulating at least one peripheral bridge allowing access to peripheral devices supported by the at least one client device for the software application that is executed on the at least one application server.

* * * * *